United States Patent [19]

Albanesi et al.

[11] 4,440,880

[45] Apr. 3, 1984

[54] PROCESS FOR STABILIZING BY ENCAPSULATION RED PHOSPHORUS TO BE USES AS FLAME RETARDANT OF POLYMERIC MATERIALS AND PRODUCT SO OBTAINED

[75] Inventors: Giancarlo Albanesi; Gianfranco Rinaldi, both of Milan, Italy

[73] Assignee: Saffa S.p.A., Milan, Italy

[21] Appl. No.: 314,049

[22] Filed: Oct. 22, 1981

[30] Foreign Application Priority Data

Nov. 19, 1980 [IT] Italy ................. 26064 A/80

[51] Int. Cl.$^3$ ................. C08K 3/02; C08K 9/10; C08L 61/28
[52] U.S. Cl. ................. 523/205; 523/200; 524/80; 524/414
[58] Field of Search ............ 524/414, 80; 523/205, 523/200; 427/221; 428/403

[56] References Cited

U.S. PATENT DOCUMENTS

| | | | |
|---|---|---|---|
| 3,721,651 | 3/1973 | Yates | 260/29.4 R |
| 3,806,488 | 4/1974 | Stone et al. | 524/414 |
| 4,010,137 | 3/1977 | Brady | 524/414 |
| 4,105,735 | 8/1978 | Dany et al. | 524/414 |
| 4,138,356 | 2/1979 | Vincent et al. | 523/205 |
| 4,145,369 | 3/1979 | Hira et al. | 523/205 |
| 4,182,839 | 1/1980 | Tesson | 528/2.54 |
| 4,187,207 | 2/1980 | Cerny et al. | 524/414 |
| 4,208,317 | 6/1980 | Cerny et al. | 523/205 |

FOREIGN PATENT DOCUMENTS

| | | |
|---|---|---|
| 2646835 | 4/1978 | Fed. Rep. of Germany . |
| 2655739 | 4/1978 | Fed. Rep. of Germany . |
| 1545716 | 5/1979 | United Kingdom . |

*Primary Examiner*—Allan Lieberman
*Attorney, Agent, or Firm*—Karl F. Ross

[57] ABSTRACT

A process for stabilizing by encapsulation red phosphorus powder for using it as flame retardant for polymeric materials, consisting in preparing a red phosphorus dispersion in an aqueous solution of a melamine condensate cationized with a mineral acid, consisting of melamine, formaldehyde, triethanolamine and a monohydroxyl alcohol having up to 5 carbon atoms, in heating the aforesaid dispersion, under stirring, at 80°–100° C. in order to precipitate said condensate in the form of a melamine resin partially cross-linked around the individual red phosphorus particles which are so stabilized by a continuous and compact layer of said resin, then in completing the cross-linking of same in a final dehydration step by drying at 80°–130° C.

18 Claims, No Drawings

PROCESS FOR STABILIZING BY ENCAPSULATION RED PHOSPHORUS TO BE USES AS FLAME RETARDANT OF POLYMERIC MATERIALS AND PRODUCT SO OBTAINED

The present invention relates to a process for stabilizing phosphorus, in particular red phosphorus in powder—the term "red phosphorus" being intended to designate red phosphorus in any of its allotropic forms—by encapsulation thereof in a melamine resin, and to the corresponding product, suited to be used as flame retardant of polymeric materials.

BACKGROUND OF THE INVENTION

The use of red phosphorus as a flame retardant of polymeric materials is widely described, in the patent literature, according to which red phosphorus powder is employed in percentages depending on the nature of the polymeric material, generally in admixture with coadjuvant substances.

It is also known that red phosphorus, in the open air, reacts with oxygen and water vapor, so evolving, besides oxygenated acids, also phosphine, which is known to be very toxic, what results in a serious drawback for the above-mentioned use of red phosphorus, both, and chiefly, during the incorporation of same into the polymeric materials, as the relevant operative conditions, particularly the molding step, magnify the aforesaid undesired phenomenon to such an extent as to prevent said technical use of red phosphorus, and during the storage and handling which precede such incorporation.

Many processes have been described in the past, which aimed at stabilizing red phosphorus powder against phosphine forming by mixing or encapsulation of this powder with various materials, such as, for example, potassium silicate, silver nitrate, aluminium hydroxide, copper sulphate with copper chloride, condensates of bisphenol A with cyanuric chloride, magnesium or aluminium salts of ethylenediamine-tetra-acetic acid, chlorinated waxes, liquid chlorinated paraffins, melamine, melamine resins, phenol-formaldehyde resins, epoxy resins, polyacrylonitrile etc.; the known processes, however, exhibit the drawback of providing an insufficient stabilization to phosphine forming.

SUMMARY OF THE INVENTION

It is an object of the present invention to provide a process for obtaining red phosphorus stabilized by encapsulation with a continuous and compact layer, such as to prevent the aforesaid phenomena and drawbacks, thus allowing a technical use free from any adverse technological and environmental effects.

It is another object of the present invention to carry out the aforesaid encapsulation process in an aqueous dispersion, without using organic solvents, in order to avoid the additional costs and process difficulties connected therewith.

These and still other objects, that will more clearly appear to a technician skilled in the art, are achieved, according to this invention, by effecting the encapsulation of the red phosphorus particles with a particular cationized melaminic resin, capable of cross-linking in hot conditions during the coating process of said water-dispersed particles of red phosphorus. The red phosphorus powder, in consequence of the forming "in situ" on the surface of its individual particles—according to this invention—of a continuous and compact layer of cross-linked melamine resin, results in prevention of phosphine formation, during storage and handling, and it can be easily and safely incorporated as a flame retardant into the polymeric materials.

The percentage of resin useful to stabilize red phosphorus powder may vary over a wide range, from 0.1 to 30%, preferably from 1 to 5%, in respect of encapsulated phosphorus.

The most advantageous particle size of red phosphorus is below 40 microns, but it is not critical, a particle size even above 100 microns being suitable too.

The melamine resin utilized according to this invention is a condensate or syrup prepared from melamine, formaldehyde, a monohydroxyl alcohol and triethanolamine cationized with a mineral acid and thoroughly soluble in water prior to cross-linking, wherein alcohol is the component that chemically modifies the condensate (as revealed by infrared spectroscopic analysis), by differentiating it from the known cationized melamine resins such as, for example, the ones described in U.S. Pat. No. 3,721,651 of Mar. 20, 1973, and which imparts a low viscosity to said condensate, what is particularly useful for practising the process object of this invention.

In said condensate, the cationizing mineral acid is preferably hydrochloric acid, while the monohydroxyl alcohol, which is an aliphatic alcohols having up to 5 carbon atoms, is preferably methan-ol.

The melamine resin and the process for encapsulating red phosphorus powder with the resin itself, according to the present invention are also substantially different from what is disclosed and forms the object of German published patent application No. 2,646,835 (Germ. Apr. 20, 1978), as regards both the components and their respective composition ratios in the cited resin (particularly the formaldehyde/melamine molar composition ratios) and the various steps of the encapsulation process (carried out in the absence of organic solvents), which are determinant for the high stability characteristics of encapsulated red phosphorus powder to phosphine forming.

DESCRIPTION OF THE PREFERRED EMBODIMENT

A preferred, although not unique, embodiment of the present invention consists in preparing a hydrodispersion of red phosphorus powder having a particle size below 40 microns, in an aqueous solution of a melamine condensate containing 25.27% melamine, 36.04% formaldehyde, 8.82% methanol and 29.87% triethanolamine, cationized with hydrochloric acid, in heating said dispersion, under stirring, at about 100° C., so obtaining the encapsulation of the red phosphorus individual particles, due to slow precipitation thereonto, in a continuous and compact layer, of said condensate in the form of a partially cross-linked insoluble melamine resin, the cross-linking thereof completes during a successive dehydration step by drying in an inert gas flow, or preferably under vacuum, at about 100° C. until formaldehyde does no longer form, so obtaining a powder of encapsulated red phosphorus.

More particularly, the abovesaid preferred embodiment of the invention comprises the following steps:

(a) preparing the malamine condensate: in a first step, methanol, triethanolamine, formaldehyde (the last substance in an aqueous solution at approximate 45% calculated on dry basis) are reacted for about 2 hours at approx. 85° C. in percent ratios, referred to the dry substance, respectively of 8.82%, 29.87% and 36.04%, the remaining 25.27% being the melamine which is to be added in a second step, at the end of the aforesaid reaction, in order to cause the melamine condensate to form by heating the aforesaid composition at about 90° C. for approx. 6 hours—the starting pH value of 9.5–9.8 being adjusted to the value of 7.5–7.8—till a viscosity of 420–470 centipoises at 20° C. is attained, whereupon, after having adjusted the pH to a value of 7–7.6, it is diluted with water, so obtaining a solution at about 38% of dry substance and with a viscosity of 40–50 centipoises at 20° C. pH adjustments are effected by means of hydrochloric acid in an aqueous solution at 18%, thus cationizing the melamine condensate.

(b) Encapsulating red phosphorus powder: a hydrodispersion of micronized red phosphorus powder having a density of 1.38–1.58 is additioned with a desired amount of the aqueous solution at 38% of cationized melamine condensate, prepared as per point (a); the so obtained phosphorus dispersion in the melamine condensate solution is heated, under stirring, for about 1 hour at approx. 100° C., keeping substantially unaltered—by means of a condenser—the reaction mixture volume: under such conditions the melamine condensate precipitates slowly and uniformly (evolving formaldehyde) in the form of a resin partially cross-linked, at first in the liquid-viscous, then in the solid state, around the red phosphorus particles, so encapsulating them. Cross-linking is then completed during dehydration by drying of the product, preferably in a thin layer, at about 100° C. and in an inert gas flow or preferably under vacuum, till formaldehyde does no longer evolve. At the end a red phosphorus powder is obtained, which is free-flowing, stabilized to phosphine forming and easily dispersible into the polymeric materials, for example by means of processes based on plastic mass melting, or by incorporation into hydrodispersions and aqueous polymeric emulsions, which are then utilized in film-forming processes (for example paints, glues, etc.), by incorporation into elastomers, by dispersion into polymeric product solutions, by dispersion into prepolymeric liquid systems with one or more components and the like.

A variant of the process object of the present invention consists in adding to the red phosphorus powder hydrodispersion, already encapsulated with cationized and partially cross-linked melamine resin, before subjecting said dispersion to dehydration with simultaneous completion of the resin cross-linking, a vehicle, preferably a water-soluble vehicle, in which, at the end of the process after dehydration, the stabilized red phosphorus powder remains dispersed, so obtaining a solid composition, that e.g. can be flaked, or a liquid composition, both compositions having a high red phosphorus content, for example of 70%, and being more advantageously or easily employable, under safe conditions, as anti-flame agents in the successive processes of additivation to the polymeric materials. Said vehicle, to be selected from among the ones which are consistent with the polymeric material to be used, may be for example Σ-caprolactam or a paraffin wax—in such case the final composition is solid and in the form of flakes—or a polyol or a paraffin oil, preferably a chlorinated one—in such case the final composition is liquid.

The solid or liquid flow-retarding compositions prepared according to the invention may be used to make a self-extinguishing polymeric composition. Generally the solid or liquid flame-retarding composition constitutes 0.5 to 20% by weight of the self-extinguishing polymeric composition. Preferably the solid or liquid flame-retarding composition constitutes 3 to 15% by weight of the self-extinguishing polymeric composition. Preferred polymers to be used in the self-extinguishing polymeric compositions include polyolefins and polyamides.

The process object of the present invention and the corresponding product will be better comprehended on the basis of the following examples, which are given for merely illustrative but not limitative purposes.

EXAMPLE 1

640 g of an aqueous solution containing 45% of formaldehyde (9.6 moles), 70.5 g (2.2 moles) of methanol, 238.78 g (1.6 moles) of triethanolamine were introduced into a conventional reactor, known in the art, equipped with electrical heating, a reflux condenser with a vacuum intake and a magnetic stirrer, after having started both stirrer and condenser. The mixture so obtained, having a pH=9.8, was brought to 85° C. and maintained at such temperature for 2 hours. After cooling to 50° C., 201.8 g (1.6 moles) of melamine were added (the mixture now consisted of 36.04% formaldehyde, 8.82% methanol, 29.87% triethanolamine and 25.27% melamine). The pH was adjusted to a value of 7.6 by addition of 48 ml of hydrochloric acid at 18% in an aqueous solution, and the mixture temperature was raised to 90° C. and kept such for 6 hours, so obtaining a melamine condensate solution having a viscosity of 450 centipoises at 20° C. At the end of this heating period said condensate solution was stabilized by addition of 390 ml of water and by adjusting the pH to a value of 7.5 by adding 80 ml hydrochloric acid at 18% in an aqueous solution, finally obtaining a solution of cationized melamine condensate at 38.3% of dry substance having a viscosity of 40 centipoises at 20° C. The above-cited pH adjustments represent the cationizing steps of the melamine condensate.

27.6 ml of the above-obtained solution of cationized melamine condensate were drawn and introduced into a reactor (equipped with a mechanical stirrer, a condenser and a heating jacket) along with 300 g of red phosphorus powder, having a particle size below 40 microns, in the form of an aqueous dispersion having a density of 1.38. At the conclusion of this operation the components were homogenized by stirring, thus obtaining a red phosphorus powder suspension in a cationized melamine solution condensate, which was heated at 100° C. for 1 hour. During such heating time the condensate become insoluble (with formaldehyde evolution) and slowly and uniformly precipitated, in the form of a partially cross-linked melamine resin, at first in the liquid-viscous state then turning into the solid state, onto the particles' surfaces of the red phosphorus powder, which were thus encapsulated by a very adherent, continuous and compact layer of said resin; finally, a water dispersion of red phosphorus encapsulated by melamine resin, having a slurry-like consistence was obtained. Said dispersion was spread to form a thin layer of 2–3 mm thickness in a tray and was put into an oven at 90° C. under vacuum, at a residual pressure of approx. 30 mm Hg, till formaldehyde evolution was no longer observed. During such drying, both dehydration of said dispersion and completion of melamine resin cross-linking occurred, and at the end a friable layer, easily convertible into a free-flowing product, of red phosphorus powder encapsulated with 4% of melamine resin was obtained; such powder proved to be stable to phosphine forming and was easily dispersible into the polymeric materials as a self-extinguishing product. Said encapsulated phosphorus powder was exposed for three months to the air and during such time the practical absence of phosphine (less than 0.3 ppm) was checked by means of a detector apparatus of the type equipped with a little suction pump and a detecting phial, having a minimum sensitivity to phosphine of 0.1 ppm (Dräger Multi Gas Detector Mod. 21/31).

The melamine resin obtained as explained hereinbefore was subjected to infrared spectroscopic analysis; said analysis revealed an absorption band at 2810 cm$^{-1}$ corresponding to symmetrical stretching $\gamma_s OCH_3$ and a great intensification of the band at 1080 cm$^{-1}$ corresponding to ethereal stretching $\gamma_{as} COC$, what clearly points out that such resin was methylated due to the chemical action of methyl alcohol in the above-described reactions.

EXAMPLE 2

Using the same apparatuses, modalities and substances as in example 1, a red phosphorus powder encapsulated with melamine resin was prepared, with the only exception that the percent composition of the starting components of the melamine condensate were as follows: 34.66% formaldehyde, 12.34% methanol, 28.72% triethanolamine and 24.28% melamine.

Such condensate exhibited a viscosity (after stabilization) of 33 centipoises at 20° C. The encapsulated red phosphorus powder so obtained was endowed with properties like those of example 1.

EXAMPLE 3

Using the same apparatuses, modalities and substances as in example 1, a red phosphorus powder encapsulated with melamine resin was prepared, with the only variant that the percent composition of the starting components of the melamine condensate were as follows: 30.85% formaldehyde, 21.96% methanol, 25.57% triethanolamine and 21.62% melamine.

Said condensate exhibited a viscosity (after stabilization) of 23 centipoises at 20° C. The encapsulated red phosphorus powder so obtained was endowed with properties like the ones of example 1.

EXAMPLE 4

Using the same apparatuses, modalities and substances as in example 1, with the only variant of including in the melamine condensate composition 148 g of butanol instead of methanol, a red phosphorus powder encapsulated with melamine resin was prepared, which exhibited substantially the same characteristics as the one obtained in example 1, in particular as regards the stability to phosphine forming.

EXAMPLE 5

Using the same apparatuses, modalities and substances as described in example 1, a powder of red phosphorus encapsulated with melamine resin was prepared, with the variants of using orthophosphoric acid in an aqueous solution at 80% as cationizing mineral acid, and of effecting dehydration by drying in a nitrogen stream at 130° C. The encapsulated red phosphorus powder had the same characteristics as the one obtained in example 1.

EXAMPLE 6

Using the same apparatuses, modalities and substances as described in example 1, a composition consisting of Σ-caprolactam incorporating, in a dispersed manner, 70% of red phosphorus powder encapsulated with melamine resin was prepared, the variant brought to the process consisting in adding 128 g of Σ-caprolactam to the hydrodispersion of red phosphorus powder at the end of the encapsulation with the partially cross-linked melamine resin, and in going on heating the reactor containing the mixture of the aforesaid components for 2 hours at 100° C., always keeping the reactor stirrer running and creating a vacuum in the reactor. During such time-period the mixture dehydrated and the resin completed its cross-linking, finally providing a homogeneous dispersion of an encapsulated red phosphorus powder in molten Σ-caprolactam. Said molten product was poured in thin layer into trays where it solidified by cooling, whereupon the product was reduced to flakes which proved to be stable to phosphine forming and could be easily incorporated into polyamides during hot extrusion thereof in extruder, in order to impart the desired self-extinguishing properties to them.

EXAMPLE 7

Using the same apparatus and modalities as in example 6, but employing, instead of Σ-caprolactam, the same amount of a polyol-polyether (obtained from ethylene oxide and propylene oxide with a hydroxyl number of 56 and a viscosity of 550 centipoises), a liquid composition consisting of 70% red phosphorus powder encapsulated with melamine resin, according to example 1, dispersed in said polyol was prepared. In this case, at the end of the dehydration step and cross-linking completion step of the melamine resin, a liquid composition was obtained, which proved stable to phosphine forming and already ready to be easily incorporated into the compositions intended for the production of polyurethane resins also of the foamed type, in order to impart self-extinguishing properties to them.

EXAMPLE 8

In a conventional horizontal drum mixer known in the art, 25 kg of a homogeneous mixture consisting of 88% polyamide 6—6 in cylindrical 3×3 mm granules for general uses, and for 12% of the composition of red phosphorus dispersed in Σ-caprolactam obtained in example 6 were prepared. Said mixture was put into a single-screw extruder equipped with an electrical heating device, in which the mixture was homogenized in the molten state and came out from the extruder head in the form of strands which, after cooling in water and passing through a cutter, were reduced to cylindrical 3×3 mm granules from which, by injection molding, specimens of 152.4 mm length, 12.7 mm width and 1.6 mm thickness were obtained, which were subjected to the self-extinguishing test according to the vertical flame method UL-94 (Underwriter Laboratory Bulletin 94) by vertically placing the specimens being tested on a Bunsen flame for 10 seconds and then for another 10 seconds after combustion extinguishing. The polyamide material additivated as explained hereinbefore may be classified, according to said UL-94 method, as a self-extinguishing substance of V-O degree. During all the aforesaid mixing, extruding and molding operations, the phosphine forming, determined by means of the detector described in example 1, was always below 0.3 ppm.

EXAMPLE 9

25 kg of high density polyethylene (density=0.955 g/ml) in spherical granules (diameter=about 3 mm), homogeneously wetted with 120 ml of vaseline oil (density=0.877) were introduced into the mixer of example 8; then 2 kg of the encapsulated red phosphorus powder of example 1 with 4% of melamine resin were added and the whole was mixed for 30 minutes. At the end of such mixing, polyethylene granules homogeneously coated with encapsulated red phosphorus powder were obtained, which were fed to an electrically heated single-screw extruder having a head temperature of about 200° C., so obtaining strands which, after cooling in water and passing through a cutter, were reduced to cylindrical 3×3 mm granules, from which, by injection molding, specimens were obtained having a length of 152.4 mm, a width of 12.7 mm and a thickness of 1.6 mm. After having been subjected to the UL-94 self-extinguishing test described in example 8, they were classified of degree V-II, the extinguishing time ranging from 6 to 10 seconds. During all the above-mentioned mixing, extruding and molding operations, the phosphine forming, checked by means of the detector described in example 1, was always below 0.3 ppm.

EXAMPLE 10

For comparative purposes, in order to prove the substantial importance of methyl alcohol for the characteristics of the melamine condensate, of which it is a component, and the consequent influence of such characteristics on the encapsulation process object of the present invention, a cationized melamine condensate was prepared (using the same apparatuses and modalities of example 1) by reacting 39.53% of formaldehyde, 32.77% of triethanolamine and 27.70% of melamine. Said condensate, of the same type as the one described in the already cited U.S. Pat. No. 3,721,651, exhibited, after stabilization, a viscosity of 260 cps at 20° C., substantially higher than the one of the corresponding condensate of example 1; during the successive red phosphorus powder encapsulation step (always according to example 1) it was noticed that the encapsulation process occurred by insolubilization of the melamine condensate directly in the solid state, without passing through the liquid-viscous phase.

Furthermore, the infrared spectroscopic analysis of the melamine resin so obtained, did not show the absorption band $\gamma_sOCH_3$ that was observed in the corresponding resin of example 1. From the foregoing, particularly from examples 1 and 10, it is evident that there is a correlation between the participation of the alcohol in the composition of the melamine condensate and the characteristics of the latter, such characteristics being, in their turn, advantageous for purposes of obtaining an excellent encapsulation of the red phosphorus powder, according to the process of the present invention.

Of course, modifications and variations, all falling within the scope of the inventive principle, may be brought to the invention as described hereinbefore, and the process and product details may be replaced by other technically equivalent elements.

We claim:

1. A process for stabilizing red phosphorus powder, in its various allotropic forms, by encapsulating the particles of said powder in a malamine resin for its safe use as a flame retardant of polymeric materials, which comprises the steps of:

(a) preparing an aqueous solution of a melamine condensate cationized with a mineral acid by reacting in an aqueous medium melamine, formaldehyde, triethanolamine, and an aliphatic monohydroxyl alcohol having up to 5 carbon atoms, in the respective percent by weight ratios: 25.27% to 21.62%, 36.04% to 30.85%, 29.87% to 25.57% and 8.82% to 21,96%, and adjusting the pH thereof with the mineral acid;

(b) forming a hydrodispersion of the solution formed in step (a) by dispersing red phosphorus powder directly therein;

(c) heating said hydrodispersion, under stirring, at 80° to 100° C. to encapsulate individual particles of the red phosphorus powder by precipitating onto said individual particles of red phosphorus powder, said melamine condensate to form a continuous and compact layer of an insoluble, partially cross-linked melamine resin; and (d) subsequently drying the insoluble, partially cross-linked layer of melamine resin in an inert gas stream at 80° to 130° C. to obtain a cross-linked melamine resin-encapsulated red phosphorus powder suitable for easy and safe dispersion in polymeric materials, said layer of melamine resin which encapsulates said red phosphorus powder amounting to 0.1 to 30% by weight of the red phosphorus powder.

2. The process defined in claim 1, step (a), wherein said aqueous solution of melamine condensate is obtained by first reacting, for about 2 hours at approx. 85° C. and at a pH of 9.5–9.8, the formaldehyde, the aliphatic monohydroxyl alcohol, and the triethanolamine, the melamine being added in a second step at the end of the aforesaid reaction, in order to cause the melamine condensate to form by heating of the aforesaid composition at approx. 90° C. for about 6 hours at a pH of 7.5–7.8 till attaining a viscosity of 420–470 centipoises at 20° C., then in a third step adjusting the pH with a mineral acid to a value of 7–7.6, and diluting with water until obtaining a solution with about 38% of dry substance and with a viscosity of 40–50 centipoises at 20° C.

3. The process defined in claim 1, step (a), wherein said hydrodisperson of the red phosphorus powder in the aqueous solution of the melamine condensate is obtained by mixing said aqueous solution with a red phosphorus powder hydrodispersion having a density of 1.38–1.58.

4. The process defined in claim 1, step (a), wherein said mineral acid is hydrochloric acid and said aliphatic monohydroxyl alcohol is methanol.

5. The process defined in claim 1, step (a), wherein the red phosphorus powder has a particle size of less than 100 microns.

6. The process defined in claim 1, step (c), wherein said heating of said hydrodispersion lasts about 1 hour, maintaining unchanged the volume of the reacting mixture.

7. The process defined in claim 1, step (d) carried out under vacuum at 100° C.

8. The process defined in claim 1 wherein following step (b) the red phosphorus powder encapsulated with melamine resin is dispersed at a concentration of higher than 50% by weight in a water-soluble vehicle to obtain the encapsulated red phosphorus powder in a liquid form or in flakes.

9. The process defined in claim 8 wherein the water-soluble vehicle in which the red phosphorus powder encapsulated with melamine resin is dispersed, is Σ-caprolactam and the encapsulated red phosphorus powder is obtained as flakes.

10. The process defined in claim 8 wherein the water-soluble vehicle in which the red phosphorus powder encapsulated with melamine resin is dispersed, is a polyol or a paraffin oil and the encapsulated red phosphorus powder is obtained as a liquid.

11. Red phosphorus powder stabilized by encapsulation in a continuous and compact layer of melamine resin obtained according to the process defined in claim 1.

12. Red phosphorus powder as defined in claim 11 encapsulated in a melamine resin, suited to be used as safe flame retardant for polymeric materials, which comprises particles of red phosphorus having a mean diameter of less than 40 microns encapsulated in a continuous and compact layer of a modified melamine resin, which resin is a poly-condensation product of 25.25–24.28% melamine, 36.04–34.66% formaldehyde, 29.87–28.72% triethanolamine, and 8.82–12.34% methanol.

13. A solid flame-retardant composition for polyamides, which comprises encapsulated red phosphorus powder stabilized according to the process defined in claim 1 and an Σ-caprolactam solid vehicle.

14. A liquid flame-retardant composition for polyurethanes, which comprises encapsulated red phosphorus powder stabilized according to the process defined in claim 1 and a polyol liquid vehicle.

15. A self-extinguishing polymeric composition which includes 0.5% to 20% by weight of the red phosphorus powder encapsulated with melamine resin according to the process defined in claim 1.

16. A self-extinguishing polymeric composition which includes 3% to 15% by weight of the red phosphorus powder encapsulated with melamine resin according to the process defined in claim 1.

17. The self-extinguishing polymeric composition defined in claim 16, in which the polymer is a polyamide.

18. The self-extinguishing polymeric composition defined in claim 16, in which the polymer is a polyolefin.

* * * * *